United States Patent [19]

Desserre et al.

[11] 4,380,784
[45] Apr. 19, 1983

[54] MAGNETIC TRANSDUCER FOR READING AND/OR RECORDING OF DATA CONTAINED ON A MAGNETIC CARRIER

[75] Inventors: Jacques Desserre, Rambouillet; Michel Helle, Marcq; Jean-Pierre Lazzari, Montfort l'Amaury, all of France

[73] Assignee: Compagnie Internationale pour l'Informatique CII-Honeywell Bull (Societe Anonyme), Paris, France

[21] Appl. No.: 242,923

[22] Filed: Mar. 12, 1981

[30] Foreign Application Priority Data

Apr. 2, 1980 [FR] France .................... 80 07454

[51] Int. Cl.³ .................... G11B 5/22; G11B 5/20
[52] U.S. Cl. ............................ 360/126; 360/122; 360/123
[58] Field of Search .............. 360/126, 123, 125, 122, 360/121, 119

[56] References Cited

U.S. PATENT DOCUMENTS

| 3,353,168 | 11/1967 | Poumakis | 360/123 |
| 3,700,827 | 10/1972 | Nagao | 360/122 |
| 3,975,771 | 8/1976 | Lazzari | 360/122 |
| 4,016,601 | 4/1977 | Lazzari | 360/122 |
| 4,149,205 | 4/1979 | Berghof et al. | 360/123 |

FOREIGN PATENT DOCUMENTS

| 746537 | 3/1956 | United Kingdom . |
| 1344890 | 1/1974 | United Kingdom . |
| 1357400 | 6/1974 | United Kingdom . |

OTHER PUBLICATIONS

IBM, TDB, F. L. Rogers, Jr., Write-Wide, Read-Narrow Magnetic Head, vol. 4, No. 10, Mar. 1962, p. 29.
IBM, TDB, L. F. Shrew, Increased Density Magnetic Recording, vol. 2, No. 2, Aug. 1959, p. 35.
IBM Tech. Disc. Bull., C. H. Stapper et al., Low Noise Magnetic Recording Head, vol. 8, No. 4, Sep. 1965, pp. 499-500.

*Primary Examiner*—Alfred H. Eddleman
*Attorney, Agent, or Firm*—Kerkam, Stowell, Kondracki & Clarke

[57] ABSTRACT

Transducer intended for read and/or write functions on a magnetic data carrier wherein the data is contained within a plurality of tracks. The transducer includes a magnetic circuit formed by two pole pieces separated by a gap parallel to the carrier, having its larger dimension perpendicular to the direction of travel of data on a track and a winding coupled magnetically to this circuit. The transducer is characterized in that it comprises means associated with the pole pieces situated at either side of the gap as seen in the direction of its larger dimension, for channelling the magnetic flux emitted by the immediate magnetic surroundings of the track of the carrier read by the transducer.

5 Claims, 13 Drawing Figures

MAGNETIC TRANSDUCER FOR READING AND/OR RECORDING OF DATA CONTAINED ON A MAGNETIC CARRIER

CROSS REFERENCE TO RELATED APPLICATION

Magnetic Transducer Comprising a Gap of Variable Larger Dimension for Reading and Writing Data Present on a Magnetic Carrier; Jean-Pierre Lazzari; Michel Helle; and Jacques Desserre; Ser. No. 242,924 filed Mar. 12, 1981; corresponding to French application Ser. No. 80.07453.

BACKGROUND OF THE INVENTION

1. Field of the Invention

The present invention relates to magnetic transducers. It is applicable in particular for the reading and writing of data present on a magnetic record carrier, such as rigid or flexible magnetic discs and tapes.

2. Description of the Prior Art

It is known that in order to record data on a magnetic record carrier, at least one modification of one of its magnetic properties is produced on (or in) this carrier at a plurality of perfectly defined points of the carrier, which is manifested by at least one variation of the physical quantity characterizing the said property. Reading of data is performed by detecting these changes and by converting the aforesaid change in physical quantity into a variation of another physical quantity, which is most frequently a variation of the voltage or current of an electrical signal.

For a clearer comprehension of the object of the present invention, it may be advantageous to recall a few principles regarding magnetism. First, to magnetize a magnetic material within which the magnetic induction is weak, the material is first exposed to a positive magnetic field $H_s$ whose strength is sufficient to saturate the material, meaning that the magnetic induction in the material reaches a limiting value $B_s$. The external magnetic field is then removed. A magnetic induction greater than zero, referred to as "remanent induction" $B_r$ and characteristic of the material, then remains in the material. The ratio B/H between the induction and the magnetic field when the field H is caused to change towards zero, is referred to as the "initial magnetic permeability of the material," and this can be generally illustrated on an initial magnetization curve.

An anisotrophic magnetic material has two preferential directions of magnetization at right angles to each other. One of these is referred to as the "direction of easy magnetization." The other is referred to as "direction of difficult magnetization." The initial permeability of the material in the direction of difficult magnetization is considerably greater than the initial permeability of the material in the direction of easy magnetization. The magnetic property utilized to record data on a magnetic carrier is defined, for example, either by the absence or presence of a remanent magnetic induction or by an optional variation of the magnetization.

Two forms of carriers, discs and tapes, are frequently employed in connection with magnetic recording and reading. Magnetic discs carry data on circular concentric recording tracks which have a radial width not exceeding a few hundredths of a millimeter and commonly cover the greater part of both their surfaces. Magnetic tapes carry data on tracks parallel to the tape length.

The means most frequently employed which enable data either to be recorded on carriers such as discs or tapes, or to be read from carriers, or finally to effect the one or the other of these functions, are referred to as "magnetic transducers." As a rule, one or more transducers is or are associated with a record carrier, and the carrier travels or is driven past the transducer. To simplify matters, it will be assumed in the remainder of the description that only one transducer is associated with one carrier; however, it will be apparent to those skilled in the art that a multi-track carrier may have a plurality of transducers associated therewith.

A magnetic transducer comprises a magnetic circuit having pole pieces around which is disposed a winding, and which also comprises a gap. This gap is situated at a very small distance from the carrier surface, ranging from between zero to a few tens of microns. The winding comprises electric input and/or output wires. In order to record data on the carrier associated with the transducer, the winding is supplied with an electric current of which the direction or the period of traversal in said winding may be varied. The carrier is thus exposed to a magnetic field intensity varying in direction, generated by the transducer in direct proximity to its gap, (between zero and a few tens of microns) and which produces on each track of the carrier a series of small magnetic areas which have magnetic inductions of opposed direction and of which the size is linked to the longitudinal recording density. For a magnetic disc, the number of magnetic areas per unit of length measured along the circumference of the track, is referred to as the longitudinal density. These areas, which are known as "elementary magnetic areas" are distributed throughout the length of the track.

Conversely, when the data of a given carrier travels before the gap of the associated transducer, the transducer may read the data by delivering electric playback or read signals via its electric input and/or output wires. These signals are in turn transmitted to electronic read circuits associated with the transducers.

The present trend in the development of magnetic transducers is to produce, in accordance with the technique for production of integrated circuits, transducers of ever smaller size (for example, having gaps of a size of the order of one to a few tens of microns). Transducers of this kind are manufactured, for example, by Compagnie Internationale Pour L'Informatique Cii-Honeywell Bull, and described in U.S. Pat. No. 3,723,665.

A transducer of this kind comprises a magnetic circuit formed by two pole pieces in thin layers, joined at one extremity in such a manner that they are coupled magnetically, and positioned with the other extremities close to the record carrier associated with the transducer in such a manner as to form a gap. The gap has a shape approximating that of a rectangle and its larger dimension is of the order of the radial width of the carrier tracks. The carrier extends substantially perpendicular to the pole pieces. One of the pole pieces is arranged on a substrate of insulating material. An electric winding is formed by thin conductive layers superposed in a direction at right angles to the plane of the pole pieces, and separated from each other by thin electrically insulating layers. The term "thin layer" denotes layers of which the thickness is of the order of a few Angstroms to a few microns. One part of the winding passes between the two pole pieces so that it may be said that these latter form a sheath for this part of the winding.

The magnetic record carrier associated with the transducer travels before the same perpendicular to the plane of the pole pieces and in a direction perpendicular to the larger dimension of the gap.

In current practice, the magnetic material forming the pole pieces is preferably anisotrophic and its axis of difficult magnetization is directed perpendicular to the record carrier.

Let us assume that each pole piece has a substantially rectangular shape. Its larger dimension is normal to the direction of travel of the record carrier. The axis of difficult magnetization of the magnetic material forming each pole piece is such that it has the same direction as the larger dimension of the pole piece.

It is known that the elementary magnetic areas forming the data of a track of the magnetic record carrier produce a magnetic leakage flux in direct proximity to the carrier surface. This magnetic flux is picked up by the gap of the integrated magnetic transducer associated with the same.

If $f$ denotes the magnetic flux penetrating into the gap of the transducer, and $f_m$ the magnetic flux passing through the winding of the same and consequently making it possible to generate a read signal, the transfer coefficient T of the integrated magnetic transducer is defined by the relationship $T = f_m / f_t$. For this transfer coefficient to be the maximum possible, one of the conditions which should be fulfilled is to have a high permeability of the thin magnetic layers forming the pole pieces, and this in the flux circulation direction. It is apparent that the utilization of an anisotrophic magnetic material whose axis of difficult magnetization extends perpendicular to the record carrier, allows sthe realization of this condition.

The advantages of an integrated magnetic transducer whose pole pieces are formed by an anisotrophic magnetic material, being the transducer described in the foregoing, are described in particular in the aforesaid U.S. Pat. No. 3,723,665. Improvements may be made in such transducers in the manner described in U.S. Pat. No. 4,016,601. These improvements make it possible to increase the efficiency of these transducers during writing as well as reading. Write efficiency is defined as the ratio between the magnetic flux generated by the transducer close to the gap, and the write current passing through the winding. Read efficiency is the ratio between the voltage available at the terminals of the winding and the magnetic flux which penetrates into the transducer at the level of the gap.

An integrated transducer as described in the aforesaid U.S. Pat. No. 4,016,601 comprises pole pieces which have a construction at the level of the gap. The length of the construction of the pole pieces in a plane parallel to the read carrier and situated in front of the carrier is equal to the large dimension of the gap, and is referred to as the "geometric track width $LP_g$." To form this construction, the pole pieces are machined by ionic attack over a depth of attack equal to $p_a$ ($p_a$ is of the order of a few microns) which produces concave lateral surfaces of the pole pieces referred to as $S_2-S_3$, $S'_2-S'_3$ situated, respectively, at either side of the gap. The surface of the pole pieces at the level of the gap, in the plane of the same, having a width $LP_g$ and parallel to the record carrier, is designated $S_1$. If L is the width of the pole pieces (small dimension of these pieces) prior to machining by ionic attack, $L/LP_g$ is commonly substantially equal to 2.

For reading, let us, for example, consider a particular track P of a magnetic disc having a supposedly insulated circular symmetry axis $Ax_p$, and three different positions $POS_0$, $POS_1$, and $POS_2$, which may be assumed by the transducer with respect to this track. In the position $POS_0$, the gap of the transducer is centered perfectly in alignment with the track; this means that irrespective of the elementary magnetic area of the track envisaged, the axis $Ax_p$ of the track in this area and the symmetry axis $Ax_E$ of the gap normal to the plane of the pole pieces, are then situated in an identical plane normal to the carrier and are parallel to each other. In this position, the voltage of the read signal collected at the terminals of the transducer or winding is a maximum, or say A.

In the positions $POS_1$ and $POS_2$ which are symmetrical with respect to $POS_0$ (the symmetry axis $Ax_E$ of the gap is shifted by an identical distance with respect to the axis $Ax_p$), the voltage of the signal collected at the terminals of the winding is nil.

By definition, the read track width $LP_L$ refers to half the width of the space situated at either side of the position $POS_0$ for which the voltage of the signal supplied by the winding is greater than or equal to 5% of A.

In current practice, it is observed that $LP_L$ is substantially greater than the write track width $LP_E$; as a matter of fact, another signal may be superimposed over the signal for reading the data of the track P, whether the track P is insulated or not. The following facts may enable a clearer grasp of the reasons for this action. During a first write operation on a track P of a record carrier by the integrated transducer associated with the same, the transducer, for example, occupies the position $POS_0$ specified above. The circular symmetry axis of the track P then written is referred to as $Ax_p$. If it is assumed that the track P is not insulated, P' and P" denote the tracks adjacent to the track P which are written on the carrier by the transducer. During a second write operation of an identical track P, the transducer occupies a position $POS'_0$ very close to but different from $POS_0$. The shift $\delta$ between these two positions is of the order of a few microns, in practice. This is attributable to the fact that the accuracy of the system for positioning the transducer with respect to the record carrier has a given maximum limit equal to the shift $\delta$, which cannot be improved. The new track P written consequently has a magnetic axis $Ax'_p$ staggered by $\delta$ with respect to $Ax_p$.

Analogously, it is apparent that the two adjacent tracks P' and P" occupy a slightly different position on the carrier from that which they had occupied following the first write operation. Consequently, a zone containing magnetic data having the memory of the previous state of the carrier, that is of the state the carrier had following the first read operation for example, and whose width is substantially equal to the shift $\delta$, is thus present at either side of the new track P having the circular symmetry axis $Ax'_p$.

The term "immediate surroundings of the track P" denotes the aggregate formed by the data of the zone having the width and by those of the two adjacent tracks P' and P".

The fact that the read track width $LP_L$ is greater than the write width $LP_E$ is essentially attributable to the following action: if, during the write operation the magnetic flux generated by the transducer allowing the writing of data on the carrier passes essentially through the surface $S_1$ (a small part of this flux passes through the lateral concave surfaces $S_2-S_3-S'_2-S'_3$), then in exchange, during the read operation, the concave lateral surfaces $S_2$ and $S_3$, $S'_2$ and $S'_3$ intercept a great part of the magnetic flux generated by the immediate magnetic surroundings of the track P. It is shown that the main reason for this action derives from the extensive anisotrophy of the material forming the pole pieces of the transducer.

The signal supplied by the winding of the transducer originating from the magnetic flux generated by the data of the track P, is referred to as "useful signal S," whereas the signal delivered by the winding originating from the magnetic flux generated by the immediate magnetic surroundings of the track P is referred to as "interference signal or noise signal B."

In current practice, the ratio S/B useful signal/noise of a transducer of this nature may be considered too low especially for some applications, particularly if the number of tracks of the carrier per unit of length is large. For a magnetic disc, this number is referred to as "radial density."

SUMMARY OF THE INVENTION

The present invention makes it possible to overcome this drawback by reducing the noise B in substantial manner, and thereby improving the S/B ratio; this is accomplished by depositing on to the surfaces $S_2-S_3$, $S'_2-S'_3$ situated at either side of the gap, a layer of magnetic material which may or may not be partially coupled magnetically with the pole pieces and whose function is to channel the magnetic flux lines coming from the immediate magnetic surroundings of the track P in such manner that this flux does not pass through the winding of the transducer.

According to the present invention, the read-write transducer for a magnetic data carrier which travels in front of the transducer head, the data being contained within a plurality of tracks, comprises: a magnetic circuit formed by two pole pieces separated by a gap parallel to the carrier, of which the greater dimension is perpendicular to the direction of travel of the data of the tracks, and a winding coupled magnetically to this circuit, and is characterized in that it comprises means associated with the pole pieces and situated at either side of the gap in question in the direction of its larger dimension, for channelling the magnetic flux emitted by the immediate magnetic surroundings of the record carrier read by the transducer, in such manner that said flux does not pass through the said winding.

In a preferred embodiment of the invention the transducer is integrated. Its pole pieces are made of thin superimposed magnetic layers. These pole pieces are magnetically coupled at one extremity and form the gap at the other extremity which is close to the carrier. The plane of the pole pieces is substantially perpendicular to the carrier. They have a constriction of width $LP_g$ at the level of the gap. This defines sidewalls of the pole pieces at either side of the gap as seen along its greater dimension. These sidewalls have the form of concave lateral surfaces $S_2-S_3$, $S'_2-S'_3$. This transducer is characterized in that the means of channelling the magnetic flux are formed by thin magnetic layers deposited on the surfaces $S_2-S_3$, $S'_2-S'_3$, and which are or are not partially coupled magnetically to the pole pieces.

It can be demonstrated that such a transducer in accordance with the invention makes it possible to obtain a read track width $LP_L$ which is substantially equal to the write width $LP_E$, and to improve the signal/noise ratio.

BRIEF DESCRIPTION OF THE DRAWINGS

The invention will now be further described, by way of example, with reference to the accompanying drawings, in which:

FIG. 1 is made up of three views, FIG. 1a, FIG. 1b and FIG. 1c.

FIG. 2 shows a preferred embodiment of an integrated magnetic transducer according to the prior art, as described in the aforenoted U.S. Pat. No. 4,016,601, the pole pieces of this transducer comprising a constriction at the level of the gap. FIG. 2 is made up of two views, FIG. 2a and FIG. 2b.

FIG. 3 is made up of FIGS. 3a, 3b and 3c, which, respectively, show the geometric trackwidth $LP_g$, the write track width $LP_E$ and the read track width $LP_L$;

FIG. 5 is made up of FIGS. 5a, 5b and 5c.

DESCRIPTION OF THE PREFERRED EMBODIMENTS

For a better understanding of the integrated magnetic transducer in accordance with the invention, it may be useful to give some reminders, on the one hand regarding the integrated magnetic transducers of the prior art illustrated by FIGS. 1a, 1b, 1c, 2a and 2b, and on the other hand, regarding the disadvantages these have upon reading data, illustrated by FIGS. 3, 3b, 3c and 4.

Integrated magnetic transducers of the type to which the present invention relates have already been described in aforenoted U.S. Pat. Nos. 3,723,665 and 3,846,842 and 4,016,601, the subject matter of which is hereby incorporated by reference.

Figures 1, 1B, 1C:
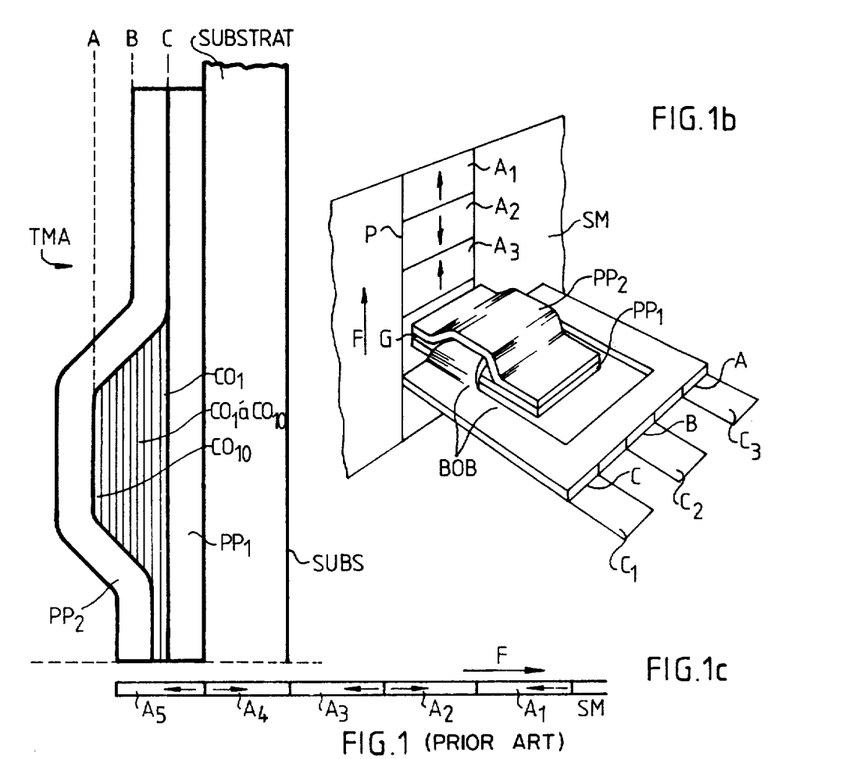
FIG. 1 illustrates the structure of an integrated magnetic transducer for reading and/or writing data present on a carrier, in accordance with the prior art, as described in the two aforenoted U.S. Pat. Nos. 3,723,665 and 3,846,842.
FIGS. 1a and 1b are three-quarter perspective views and FIG. 1c is a view in cross-section along a plane perpendicular to the carrier and parallel to the direction of travel of the same.
Figure 1A:
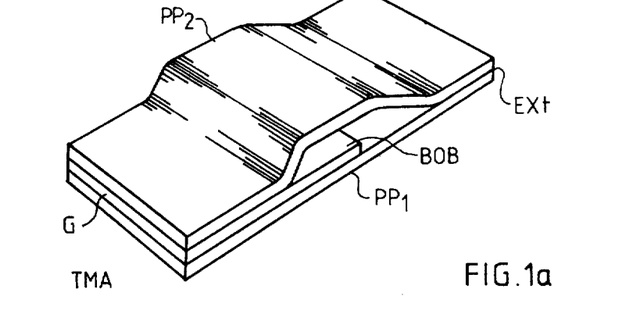

As is apparent from FIGS. 1a to 1c, an integrated magnetic transducer TMA according to the prior art comprises a magnetic circuit formed by two magnetic pole pieces $PP_1$ and $PP_2$ in the form of thin layers, which are totally superimposed and magnetically coupled to a winding BOB. The pole pieces $PP_1$ and $PP_2$ are interconnected magnetostatically at a first extremity EXT and form the gap G at the other extremity. The pole piece $PP_1$ is placed on a substrate SUBS of insulating material as is apparent from FIG. 1c.

In FIGS. 1b and 1c, the transducer TMA is shown arranged opposite a record carrier SM of which only a part has been shown to simplify matters. This carrier comprises a plurality of recording tracks of which only the track P is shown, which comprises a plurality of elementary magnetic areas of which only three are shown, namely the areas $A_1$, $A_2$ and $A_3$ in FIG. 1b, and five, being $A_1$ to $A_5$ in FIG. 1c. The carrier SM which travels in the direction of the arrow F is, for example, a magnetic disc forming part of a disc memory. Disc memories are used increasingly in data processing systems because of their storage capacity and of the comparatively short time taken by the write and/or read transducers to gain access to an item of information contained at any point of the disc starting from the instant at which they receive from the said processing system the order to gain access to this information.

The pole pieces $PP_1$ and $PP_2$ commonly comprise an assembly of several thin magnetic layers and thin insulating layers in stacked form, each magnetic layer being separated from the next layer by an insulating layer. The assembly thus specified, whether it comprises one or several thin magnetic layers, is normally denoted by the general name "thin magnetic layers."

The winding BOB is formed by a series of thin conductive and insulating layers stacked in a direction perpendicular to the plane of the magnetic pole pieces $PP_1$ and $PP_2$, a part of the thin conductive and insulating layers delimiting the gap G. The insulating layers are placed between the conductive layers. In order to simplify FIG. 1c, there has only been illustrated the conductive layers, namely $CO_1$ to $CO_{10}$, in the embodiment illustrated in this same figure. These conductive layers which have the same shape are of different size, are interconnected by conductive connecting elements which are not shown in FIGS. 1a and 1c, to simplify matters.

In current practice, the winding BOB comprises a center point B, its corresponding extremities being C and A. In known manner, in a disc memory comprising several transducers associated with several discs, any transducer which is intended to perform a read operation is selected by transmitting an electrical selection pulse to its center point B.

The winding BOB comprises three output conductors, namely the conductors $C_1$, $C_2$, $C_3$ (FIG. 1b) which are connected to the electronic read and/or write circuits of the disc memory containing the disc SM.

Figure 2A:
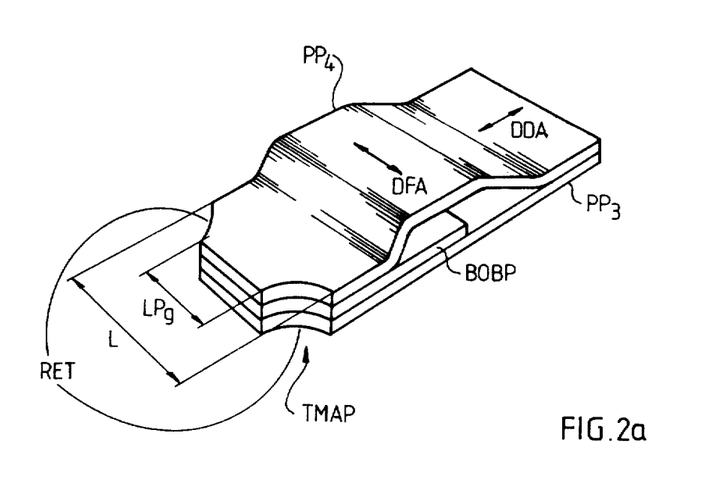
FIG. 2a is a three-quarter perspective view.
Figure 2B:
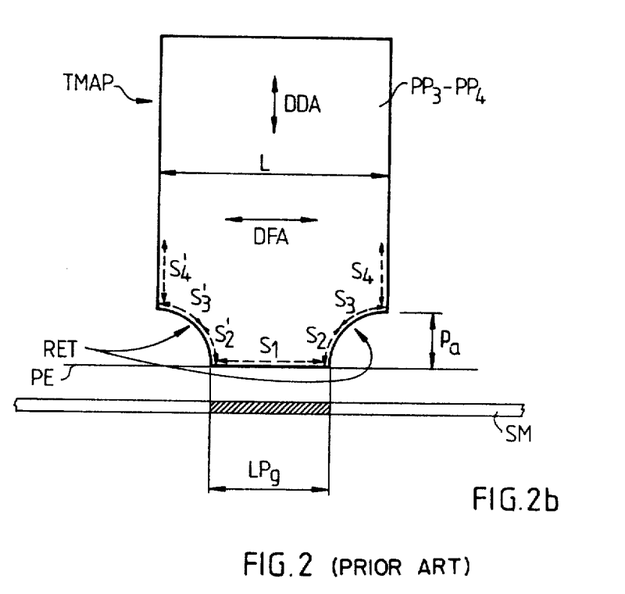
FIG. 2b is a view from above of the pole pieces.

In current practice, the integrated magnetic transducers are preferably produced in the manner illustrated in FIGS. 2a and 2b (see U.S. Pat. No. 4,016,601) such that the lateral width of the pole piece layers at the front edge, left hand side as viewed in the drawing, is less than the width of the remaining portions toward the rear of the pole piece layers. The pole pieces are thus said to be constricted or narrowed at the front of the transducer adapted to be positioned close to the carrier and the front lateral edges of the pole pieces extend rearwardly in a smooth concave curve. The terms front, rear and the like are relative terms used only for the purpose of orientation.

As is apparent from these same figures which illustrate transducer TMAP and U.S. Pat. No. 4,016,601, the pole pieces $PP_3$ and $PP_4$ of this latter are made of a magnetically anisotropic material of which the axis of difficult magnetization is aligned along the direction DDA perpendicular to the magnetic carrier SM, which remains tangent to the surface of the pole pieces. The axis of easy magnetization of the pole pieces $PP_3$ and $PP_4$ is aligned along the direction DFA perpendicular to the direction of difficult magnetization DDA and parallel to the record carrier SM. It is clear that the axis of easy magnetization is equally tangent to the surface of the pole pieces $PP_3$ and $PP_4$.

At the level of its gap GP, the transducer TMAP comprises a constriction RET at opposite sides having an attack depth $P_a$ commonly of the order of 5 to 6 microns. This constriction is such that the length of the gap $LP_g$ is appreciably smaller than the width L of the pole pieces without this constriction, that is to say the width of the pole pieces before machining. As stated above, the ratio $L/LP_g$ is of the order of 2 in current practice. As apparent from FIG. 2b, the restriction RET renders it possible to form smooth concave lateral surfaces of the pole pieces $S_2$-$S_3$, $S'_2$-$S'_3$. The surface $S_2$ ($S'_2$) is such that the angle which it makes with the normal to the carrier SM is very small whereas the angle made by the surface $S_3(S'_3)$ with this same normal to the record carrier is greater and approaches 90°.

The aforenoted U.S. Pat. No. 4,016,601 discloses such a transducer TMAP having a constriction RET, which makes it possible to record recording tracks P of specific width $LP_E$ on the carrier SM with high precision.

Figures 3, 3C:
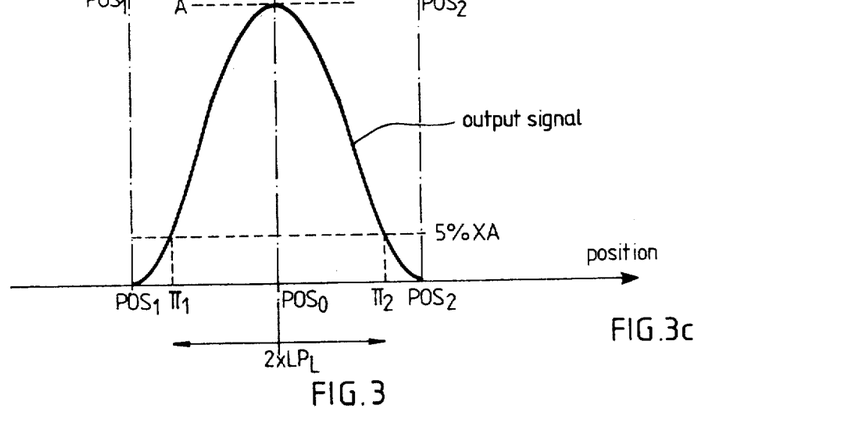
Figure 3A:
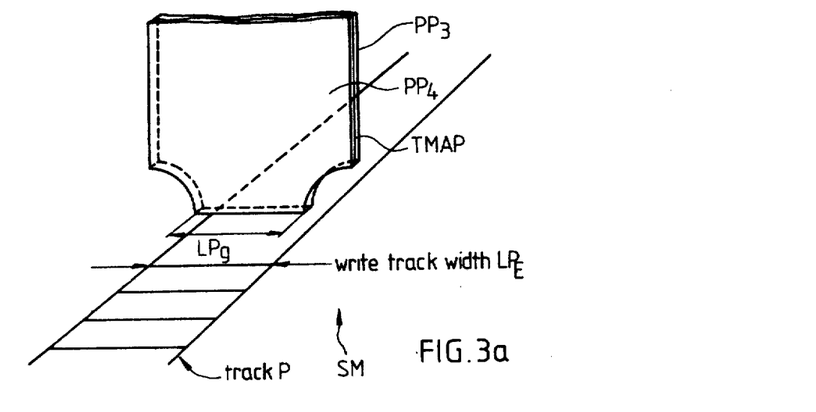

As is apparent from FIGS. 2b and 3a, this latter being a three-quarter perspective view showing the parts of the pole pieces closest to a record carrier SM, with the transducer TMAP being shown above a recording track P of the associated carrier, the width of the write track $LP_E$ is substantially equal to or a little greater than the geometric track width $LP_G$ of the transducer TMAP (length of the gap G). This is caused by a high concentration of the flux lines at the level of the gap ocupled with the anisotropy of the pole pieces and consequently to the high magnetic permeability along the direction DDA.

The symbol $S_1$ will be used to denote the surface of the pole pieces in the plane PE of the gap GP, plane PE being parallel to the record carrier SM.

Figure 3B:
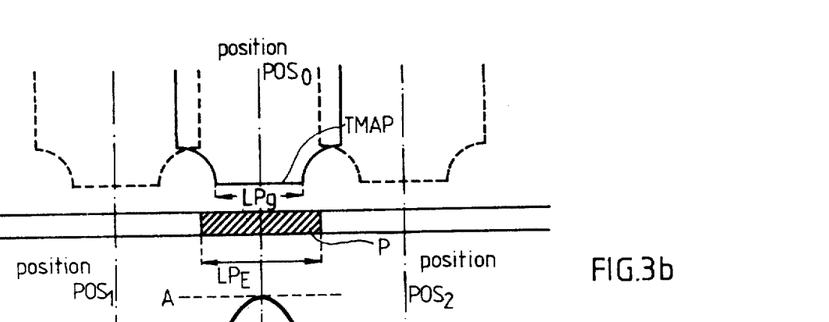

FIGS. 3b and 3c in connection with the following description will convey a clearer grasp of the definition of the width of the read track $LP_L$. In the positions $POS_0$ in which the gap GP of the transducer TMAP is centered perfectly above the track P having a write track width $LP_E$ and assumed to be separate (it is apparent that the symmetry axes contained in the plane of the figure, of the pole pieces of the transducer and of the track P coincide), the signal delivered by the transducer has a maximum voltage A as shown in FIG. 3c. In the position $POS_1$, the voltage of the signal supplied by the transducer TMAP is nil and the same applies when the transducer occupies the position $POS_2$ symmetrical to the position $POS_1$ with respect to the position $POS_0$.

When the transducer TMAP occupies a position comprised between the positions $\pi_1$ and $\pi_2$, for which the signal delivered is equal to or greater than 5% of A, it is said by definition that the distance between the positions $\pi_1$ and $\pi_2$ is equal to $2 \times LP_L$.

As stated above, the principal disadvantage of such a transducer TMAP is that the read width $LP_L$ is greater than the write width $LP_E$ (and consequently the geometric track width $LP_g$). The reasons for this will emerge more clearly by reference to FIG. 4. Let a track P$_1$ and a track P$_2$ by considered on the magnetic record carrier SM (assumed to be a disc). To simplify matters, it is assumed that the write width LP$_E$ of these tracks is equal to the geometric track width LP$_g$ of the integrated transducer TMAP in accordance with the prior art. It is assumed moreover that each of the tracks P$_1$ and P$_2$ occupies, on average, the positions POSM$_1$ and POSM$_2$ spaced apart by a distance DIP. These positions are denoted by the symmetry axes of the tracks P$_1$ and P$_2$ situated in the plane of the figure (axis at right angles to the surface of the magnetic disc SM). It is assumed furthermore that these axes generally represent mean positions occupied by the transducer TMAP when the latter performs read or write operations. These axes consequently represent the symmetry axes of the pole pieces PP$_3$ and PP$_4$ of the transducer.

In current practice, the distance DIP is a little greater than the width of the write track LP$_E$. Consequently, for a magnetic disc whose radial recording density is of the order of 240 tracks per centimeter, the distance DIP is of the order of 40 microns, whereas the length LP$_E$ is of the order of 30 microns.

As stated in the foregoing, the device or means of the disc memory which contains the magnetic disc SM which allows of positioning the transducer TMAP in alignment with the tracks P$_1$ and P$_2$ (and equally with all the other tracks of the disc) and which is well known in the art has a specified positioning precision $\delta$ of the order of a few microns. This means that during read or write operations on the track P$_1$, the integrated magnetic transducer will have a position comprised between a position POSLG$_1$ referred to as "left limiting position" and a position POSLD$_1$ referred to as "right limiting position." Positions POSLG$_1$ and POSLD$_1$ are symmetrical with respect to the median position POSM$_1$ and are spaced apart from the same by a distance $\alpha$. They are equally shown by axes in broken lines in FIG. 4.

Figure 4:
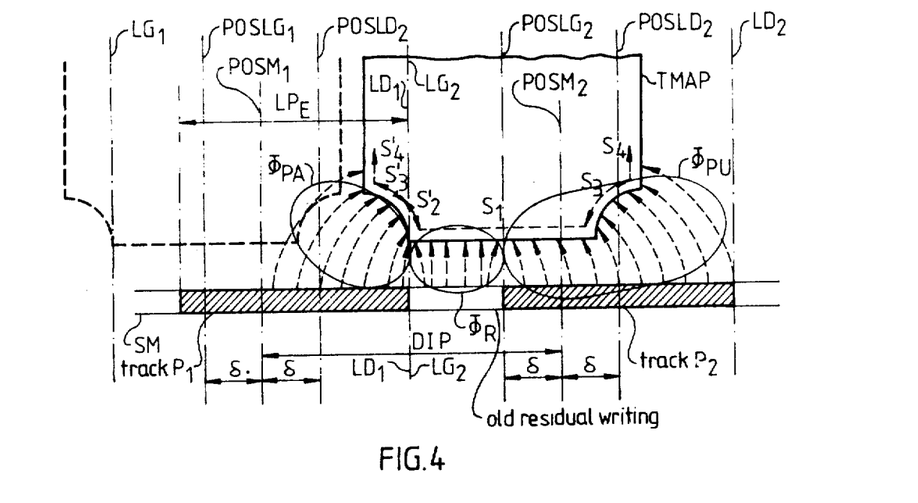
FIG. 4 clarifies the structure of the immediate magnetic surroundings of a track P of a record carrier such as a magnetic disc and the flux passing through the pole pieces.

When the transducer TMAP occupies the left-hand limiting position POSLG$_1$, the left-hand edge of its gap occupies a position marked LG$_1$ whereas if the transducer occupies the right-hand limiting position POSLD$_1$, the right-hand edge of its gap occupies the right-hand limiting position LD$_1$.

Similarly, during write or read operations on the track P$_2$, the transducer TMAP will occupy a position comprised between the left-hand and right-hand limiting positions POSLG$_2$ and POSLD$_2$ symmetrical to each other with respect to the mean position POSM$_2$ and spaced apart from the same by the distance $\alpha$. In these circumstances, the left-hand edge of the gap occupies the position LG$_2$ and the right-hand edge of the gap occupies the position LD$_2$ (see FIG. 4). To simplify matters, it is assumed that the gap edge positions LD$_1$ and LG$_2$ are practically coincident.

In FIG. 4, it was assumed that the tracks P$_1$ and P$_2$ are written when the transducer TMAP occupies, respectively, the right-hand limiting positions POSLD$_1$ and POSLD$_2$.

Let it be assumed that the transducer TMAP performs the read operations on the track P$_2$ while occupying the left-hand limiting position POSLG$_2$, that is to say, the most disadvantageous position for reading the track P$_2$.

In these circumstances, the magnetic flux passing through the pole pieces of the transducer TMAP and giving rise to a read signal, may be divided into three parts:

1. a flux $\int p_U$, referred to as useful flux, which is the magnetic leakage flux transmitted by the magnetic data of the track P$_2$ as described (position POSLD$_2$);
2. a flux $\int R$ caused by write residues of a previously written track P$_2$ (the transducer then occupying a different position from POSLD$_2$, for example, the position POSLG$_2$); and
3. a flux attributable to the adjacent track P$_1$, denoted by $\int p_A$.

The fluxes $\int R$ and $\int p_A$ which penetrate, respectively, through the surfaces S$_1$ and S'$_2$, S'$_3$ and S'$_4$ of the pole pieces and via the gap GP of the transducer TMAP, constitute a parasitic flux $\int p_{AR} = \int p_A + \int R$ transmitted by the direct magnetic surroundings of the track P$_2$. Consequently, it may be stated that this environment is formed by the write residue of the previously written track P$_2$, and by the adjacent track P$_1$. A noise signal B corresponds to this parasitic flux. The useful flux $\int p_U$ gives rise to a read signal S.

The object of the integrated magnetic transducer TMI according to the invention is to increase the signal/noise ratio S/B by channelling all or part of the magnetic interference flux $\int p_{AR}$ by flux channelling means situated at either side of the gap, on the surface S$_2$-S$_3$, S'$_2$-S'$_3$, in such manner that this interference flux penetrates to the least possible extent into the pole pieces of the transducer and consequently into its winding.

Figures 5, 5A, 5B:
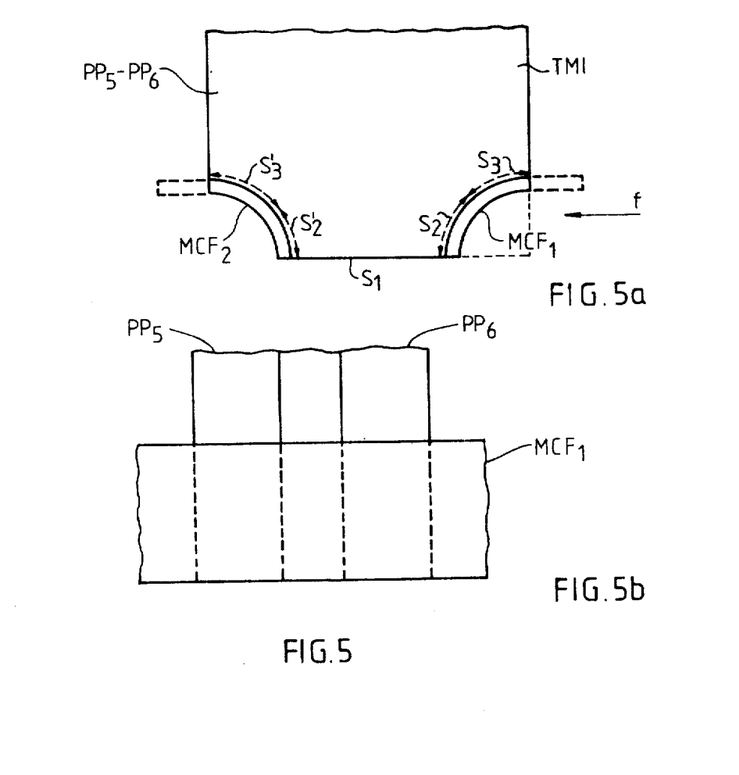
FIG. 5 illustrates a preferred embodiment of an integrated magnetic transducer in accordance with the invention.
FIG. 5a is a plan view of the pole pieces of the transducer taken at the level of the gap.
FIG. 5b is a side view of the same pole pieces taken at the level of the gap and FIG. 5c is a three-quarter perspective view of the same pole pieces.
Figure 5C:
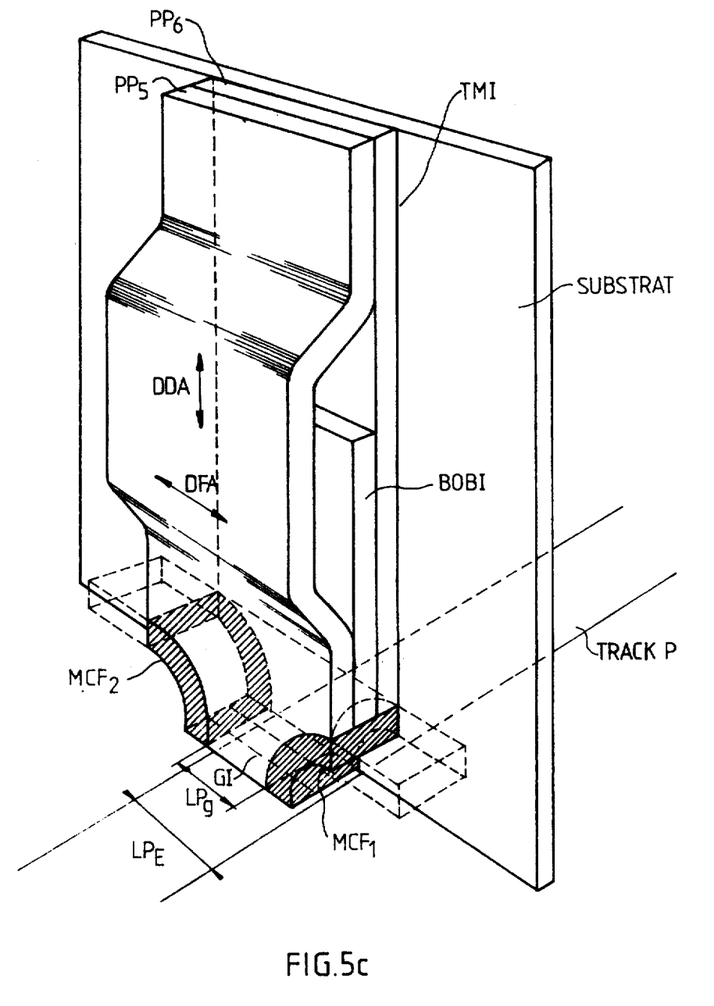

Such a transducer TMI according to the invention is shown in FIGS. 5a, 5b and 5c. As is apparent from these figures, the transducer TMI comprises a winding BOBI and pole pieces PP$_5$ and PP$_6$ with its gap denoted by GI, and also comprises flux channelling means MCF$_1$ and MCF$_2$, formed by magnetic layers, e.g. iron-nickel Fe-Ni, deposited on the concave lateral surfaces of the constriction RETI, namely surfaces S$_2$-S$_3$ and S'$_2$-S'$_3$, and which may or may not be coupled partially with the pole pieces. It should be apparent that layers MCF$_1$ and MCF$_2$ are equally deposited, as is clearly apparent from FIGS. 5a to 5c, on the conductive and insulating layers situated in the gap GI between the pole pieces PP$_5$ and PP$_6$. The flux channelling means MCF$_1$ and MCF$_2$ may comprise one or more thin layers, that is to say, may have a single-layer or multi-layer structure. They may be formed by an isotropic or anisotropic magnetic material. As is apparent from the same FIGS. 5a, 5b and 5c, the two layers MCF$_1$ MCF$_2$ may project at either side beyond the pole pieces PP$_5$ and PP$_6$ in a direction parallel to the plane of the substrate, as shown by broken lines in these figures and in a direction perpendicular to the plane of the substrate.

Figure 6:
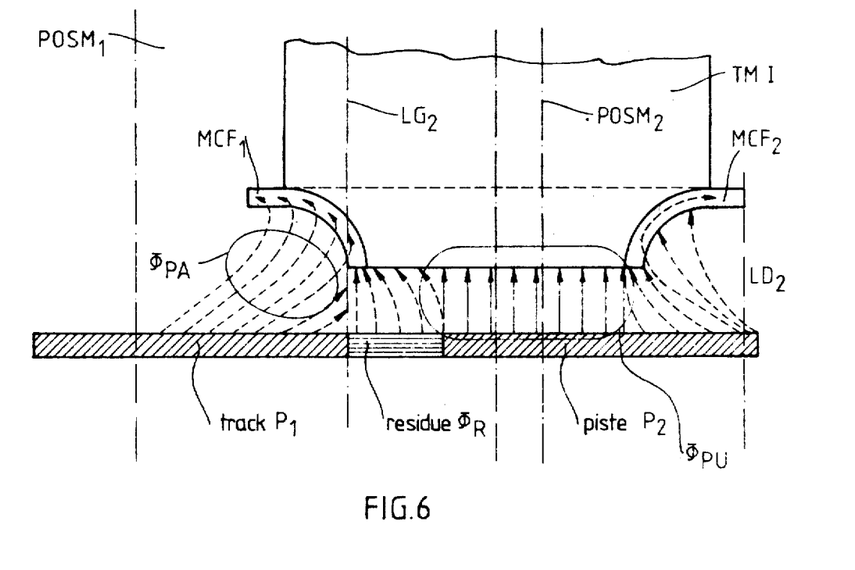
FIG. 6 diagrammatically illustrates the path followed by the magnetic flux lines emitted by the data of the record carrier through the transducer in accordance with the invention, when the transducer functions to read the data, while being offset with respect to the axis of the track being read.

Consider now FIG. 6 which shows the transducer TMI occupying the position POSLG$_2$ in line with track P$_2$, this track occupying the position POSLD$_2$. It is apparent that the interference flux $\int p_{AR}$ is channelled in its major proportion by means of the flux channelling means MCF$_1$. It is equally apparent that a small part of the principal flux $\int p_U$ is channelled by the means MCF$_2$. It still applies in this case, in which the transducer according to the invention occupies the most unfavorable position for reading the track P$_2$, that the signal/noise ratio S/B is considerably improved with respect to that obtained by a transducer TMAP according to the prior art. Actually, although the useful signal S is reduced a little, the noise signal B is reduced considerably so that the reduction of S is smaller than the increase of the factor 1/B.

The solutions specified and claimed in the aforenoted application filed together with the present application by the applicants under the title: "Magnetic Transducer Comprising a Gap of Variable Larger Dimension for Reading and Writing Data Present on a Magnetic Carrier," Ser. No. 242,924, filed Mar. 12, 1981, corresponding to French application Ser. No. 80.07453, are equally applicable to the transducer described and claimed in the present patent application. Accordingly, the subject matter of said application is hereby incorporated by reference.

We claim:

1. A magnetic transducer adapted to perform read and/or write functions on a magnetic data carrier which travels before the same, the data being contained within a plurality of tracks on the carrier comprising:
  a magnetic circuit formed by two pole pieces separated by a gap parallel to the carrier, the gap having a larger dimension perpendicular to the direction of travel of the data of a track as it passes in front of said gap, said larger dimension being defined thin superimposed magnetic layers having a constricted width at one end formed by lateral cutouts at opposite sides of the layers,
  a winding coupled magnetically to the magnetic circuit, and means disposed on said lateral cutouts at either side of the gap as seen in the direction of its larger dimension and operatively associated with the pole pieces for channelling magnetic flux emitted by the immediate surroundings of the track of the record carrier to be read by the transducer in such manner that said flux does not pass through said winding.

2. A transducer according to claim 1 wherein the two pole pieces comprise thin superimposed magnetic layers coupled magnetically at one extremity, the other extremity adapted to the positioned close to the carrier and substantially perpendicular to the carrier to form the gap, said lateral cutouts being in the form of a constriction of a width $LP_g$ at the level of the gap, which defines the lateral walls of the pole pieces in the form of concave lateral surfaces, the said channelling means being thin magnetic layers deposited on the said side walls.

3. A transducer according to claim 2 wherein the said magnetic layers deposited on the side walls of the pole pieces are partially coupled magnetically to the said pole pieces.

4. A magnetic transducer adapted to perform read and/or write functions on a magnetic data carrier which travels before the same, the data being contained within a plurality of tracks on the carrier comprising:
  a magnetic circuit formed by two pole pieces separated by a gap parallel to the carrier, the gap having a larger dimension perpendicular to the direction of travel of the data of a track as it passes in front of said gap, the two pole pieces comprise thin superimposed magnetic layers coupled magnetically at one extremity, the other extremity adapted to be positioned close to the carrier and substantially perpendicular to the carrier to form the gap, said layers having a constriction of a width $LP_g$ at the level of the gap, which defines the lateral walls of the pole pieces in the form of concave lateral surfaces, the said channelling means being thin magnetic layers deposited on the said lateral walls,
  a winding coupled magnetically to the magnetic circuit, and means situated at either side of the gap as seen in the direction of its larger dimension and operatively associated with the pole pieces for channelling magnetic flux emitted by the immediate surroundings of the track of the record carrier to be read by the transducer in such manner that said flux does not pass through said winding.

5. A transducer according to claim 4 wherein the said magnetic layers deposited on the side walls of the pole pieces are partially coupled magnetically to the said pole pieces.

* * * * *